Aug. 28, 1962   J. P. THOREL ET AL   3,050,943
LINEAR DRIVING MECHANISM
Filed April 29, 1957   5 Sheets-Sheet 1
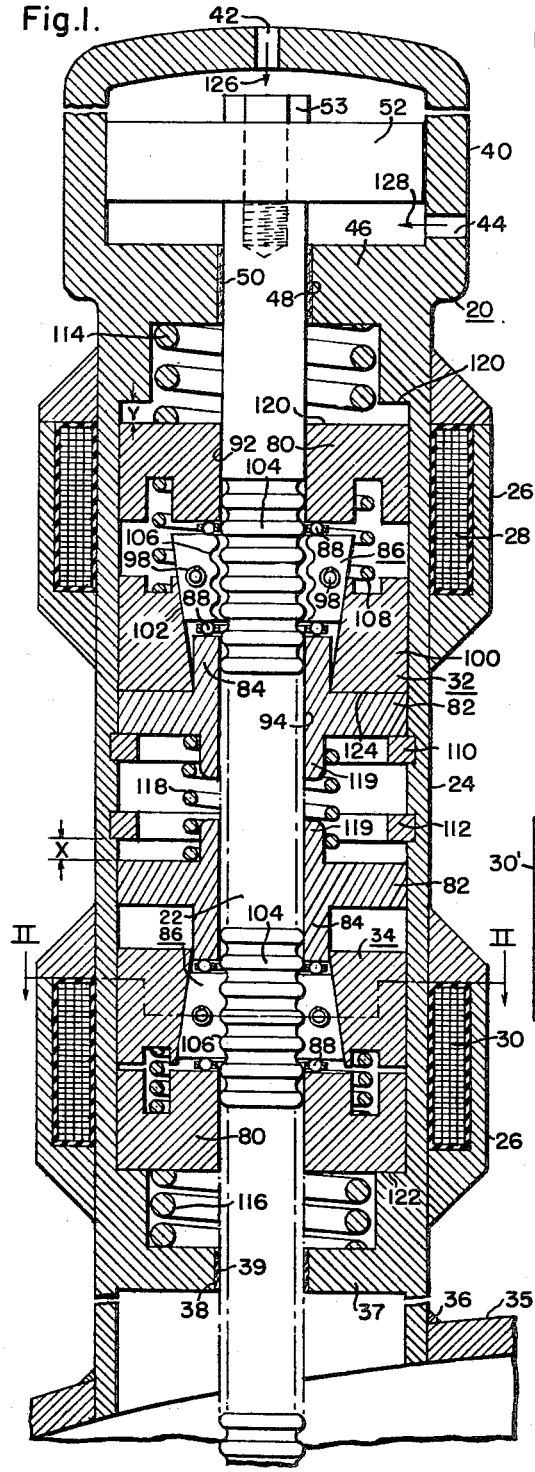
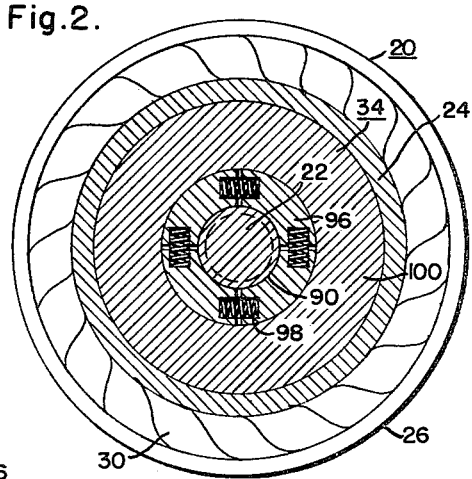
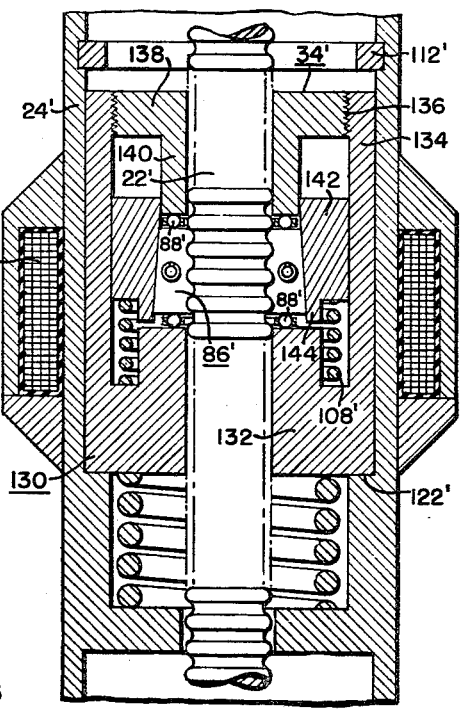
INVENTORS
John P. Thorel, Anthony J. Mei
& Howard C. Flaton
BY
Arthur T. Stratton
ATTORNEY

| OPERATION SOLENOID | SCRAMMING | HOLD | UP ALTERNATING I | II | DOWN ALTERNATING I | II |
|---|---|---|---|---|---|---|
| 65 (Valve) | DE | DE | E | E | DE | DE |
| 30 (Lower Gripper) | DE | DE | E | DE | DE | E |
| 28 (Upper Gripper) | DE | E | DE | E | E | DE |

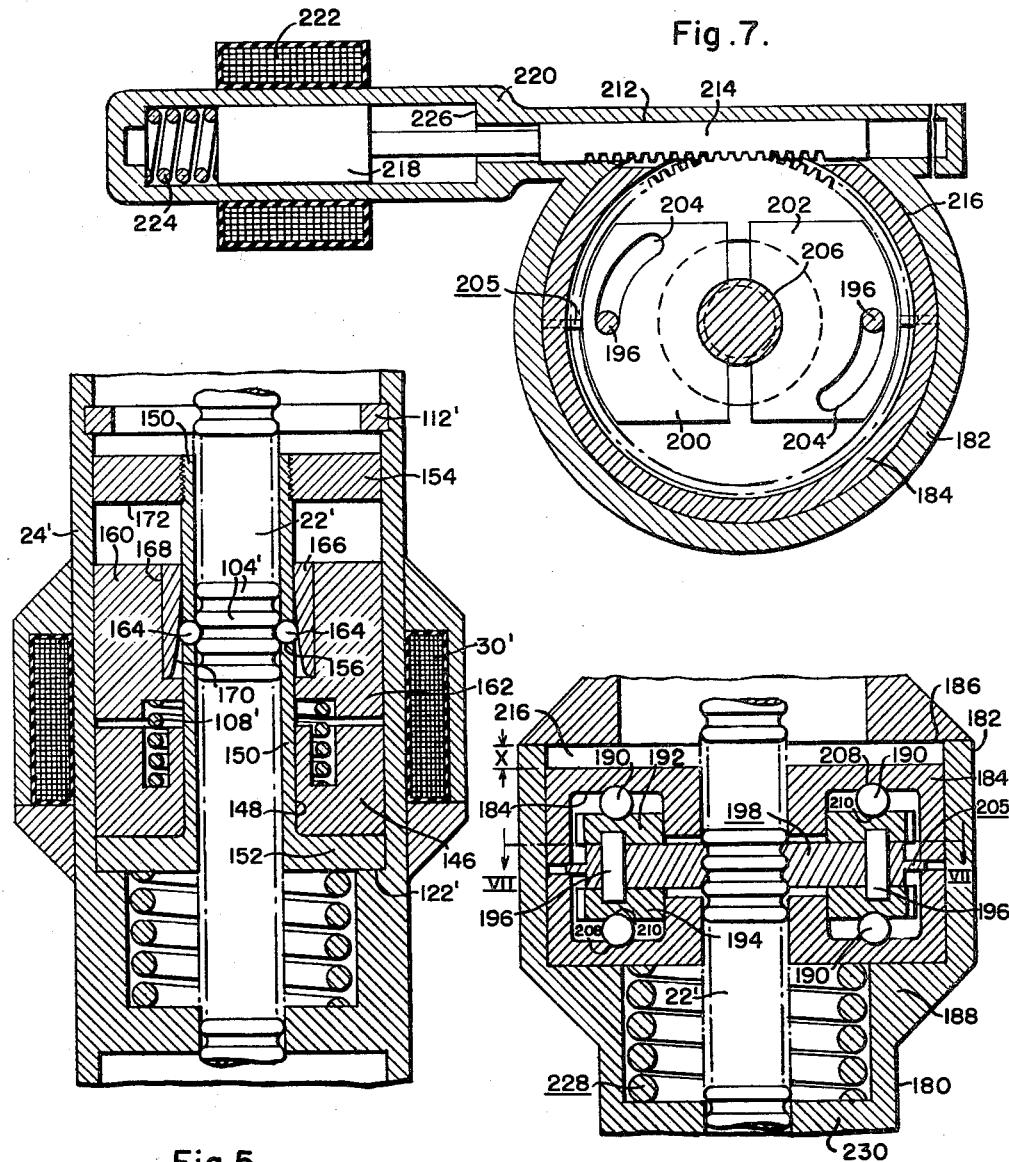

Aug. 28, 1962   J. P. THOREL ET AL   3,050,943
LINEAR DRIVING MECHANISM
Filed April 29, 1957   5 Sheets-Sheet 4
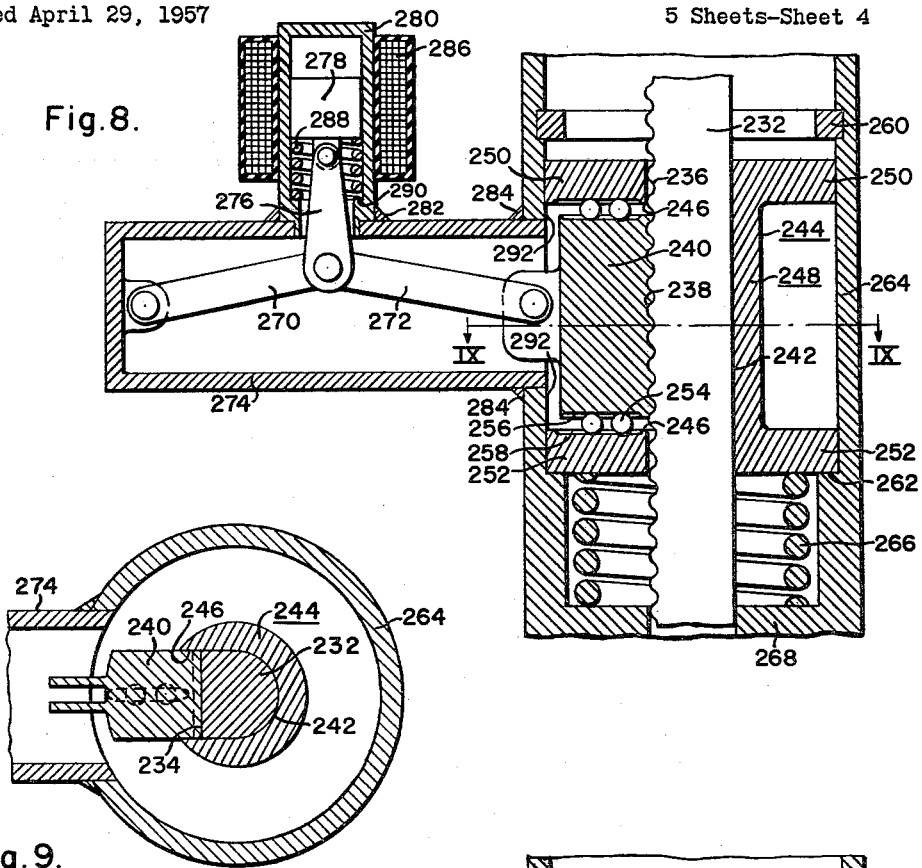
Fig. 8.
Fig. 9.
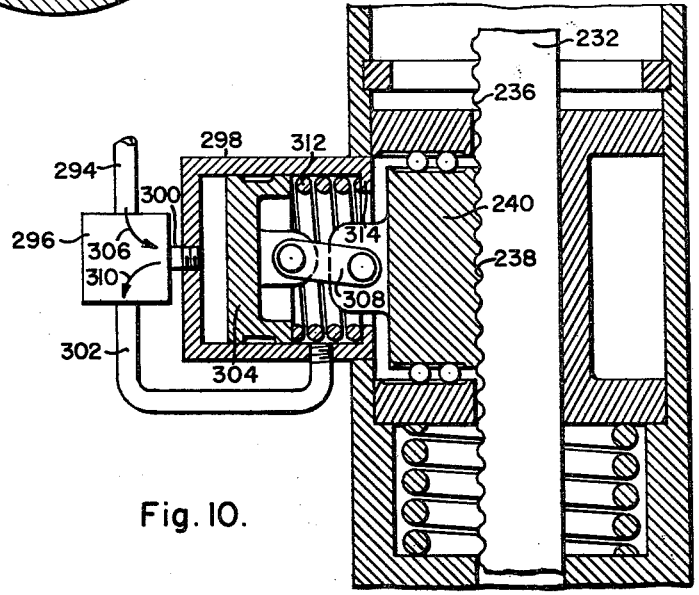
Fig. 10.

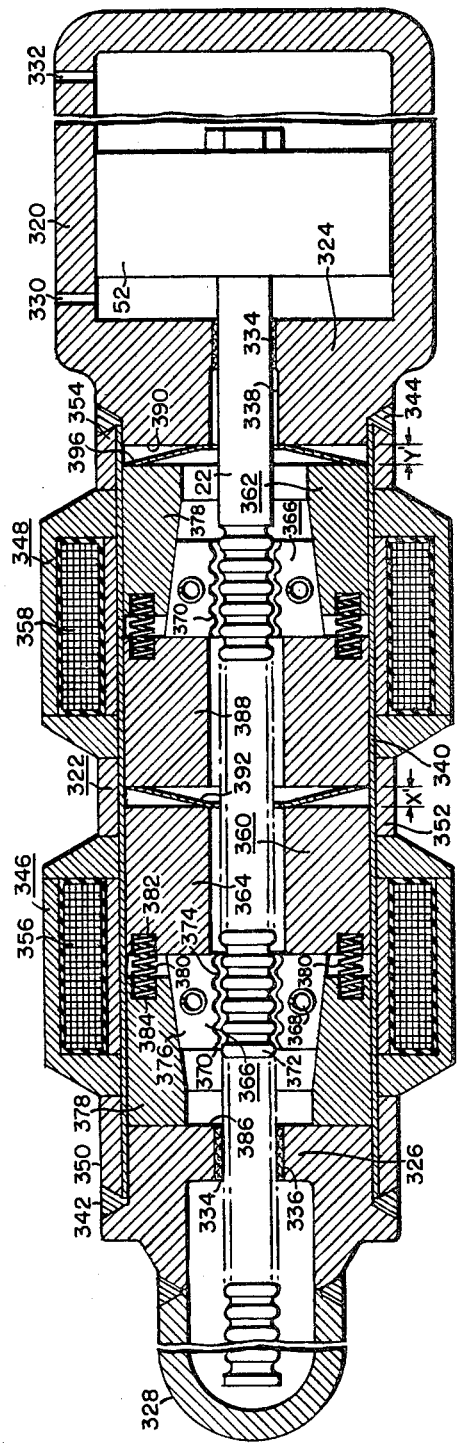

United States Patent Office 3,050,943
Patented Aug. 28, 1962

3,050,943
LINEAR DRIVING MECHANISM
John P. Thorel, Monroeville, Anthony J. Mei, Murrysville, and Howard C. Flaton, Monroeville, Pa., assignors to Westinghouse Electric Corporation, East Pittsburgh, Pa., a corporation of Pennsylvania
Filed Apr. 29, 1957, Ser. No. 655,646
15 Claims. (Cl. 60—52)

This invention relates to a linear motion device and more particularly to such a device capable of a slow controlled movement in stepwise increments thereof.

There are many applications wherein it is desired to actuate a control element in a linear direction to a desired or predetermined position for the purpose of controlling various chemical processes or reactions or for the purpose of actuating various elements of a complex machine tool. In many cases the control element must be located entirely within a sealed pressurized system. An example of the aforementioned processes is that associated with the production of nuclear energy in an atomic reactor wherein a number of control rods are moved within the reactor vessel in order to control the chain reaction developed in the core of the atomic reactor.

Previous linear motion devices have used linear motors, a plurality of solenoids to continuously move an armature in a linear direction, or rotary motors and various means for converting the rotary motion thereof to linear motion. The use of rotary motors and means to convert the rotary motion to linear motion introduces an additional mechanism which increases greatly the cost and complexity of the linear motion device. In the case of sealed systems the latter-mentioned linear motion systems are exceedingly difficult to maintain and to repair. Linear motors and solenoid-driven armatures are objectionable because the length of travel of such devices is limited respectively by the length of the stator field of the motor or the size and number of solenoids used to drive the armature. Additionally, solenoid-driven armatures cannot be stopped in an intermediate position of the travel through the magnetic field of any one solenoid but can only be stopped at the end of such travel. Thus, their use for actuating a control element in many processes or operations is limited, inasmuch as the latter require a slow movement of the control element which can be terminated at any given point in the total travel of the control element.

In many applications utilizing linear motion devices, such as in the nuclear reactor field, it is essential that a linear motion system be provided in which the armature or control element thereof, in addition to the controlled slow movement thereof, can be moved very quickly to a given point in its travel in order to terminate quickly or otherwise rapidly manipulate the process or operation being controlled. The arrangement suggested in the past for accomplishing the aforesaid quick or sudden movement of the control element utilized various unlatching or escapement means which were not only complicated mechanically but frequently did not produce the reliability and traveling speed of the control element necessary for the optimum control of the process or operation.

Previous linear motion devices suffered from the further disadvantage that complicated circuitry or mechanical connections were required in order to effect reversal of the control element and to impart the same degree of controlled movement thereof in either direction of its travel. This problem has been accentuated in those applications wherein a control element of considerable weight is supported vertically, and the movement thereof in either the upward or downward direction of travel must be closely and accurately controlled, as in atomic reactor applications.

In view of the foregoing considerations, an object of the present invention is to provide a novel and efficient linear motion device.

Another object of the invention is to provide a linear motion device wherein the movement of a control element actuated thereby can be accurately and closely controlled in either direction thereof.

Further objects of the invention are to provide a linear motion device having a minimal number of operating parts and to provide such a device adapted for operation within a sealed or pressurized system.

Still another object of the invention is to provide a linear motion device including means for imparting a closely controlled incremental movement to a control element or armature thereof.

A still further object of the invention is to provide a linear motion device having means for quickly and efficiently reversing the direction of movement of a control element actuated by the device.

Another object of the invention is to provide a linear motion device in which a control element actuated thereby can be moved quickly in either direction of its movement to a selected point in the travel of the control element.

Another object of the invention is to provide a linear motion device having means associated therewith for supporting a control element of considerable weight vertically and for imparting a closely controlled movement to the element in either the upward or downward direction thereof.

Still another object of the invention is to provide novel and efficient incremental motion producing means adapted for use with the linear motion device disclosed herein.

These and other objects, features, and advantages of the invention will be amplified during the forthcoming description of illustrative modifications of the invention, with the description being taken in conjunction with the accompanying drawings wherein:

FIGURE 1 is a longitudinally cross-sectional view of one form of a linear motion device constructed in accordance with the teachings of this invention;

FIG. 2 is a sectional view of the device illustrated in FIG. 1 taken along reference lines II—II of FIG. 1;

FIG. 4 is a longitudinally sectional view of another form of the linear motion controlling or latching means illustrated in FIG. 1 and constructed according to the invention;

FIG. 5 is a longitudinally sectional view of another form of latching means which can be utilized in the arrangements illustrated in FIGS. 1, 3 and 11 of the drawings;

FIG. 6 is a longitudinally sectional view of still another form of gripping means arranged according to the invention;

FIG. 7 is a sectional view of the arrangement illustrated in FIG. 6 taken along reference lines VII—VII thereof;

FIG. 8 is a longitudinally sectional view of still another form of latching means contemplated by the invention;

FIG. 9 is a sectional view of the device illustrated in FIG. 8 taken along reference lines IX—IX;

FIG. 10 is a longitudinally sectional view of still another form of latching or gripping means constructed according to the invention;

FIG. 11 is a longitudinal sectional view of another form of a linear motion device arranged according to the teachings of the invention.

Figures 3, 12:
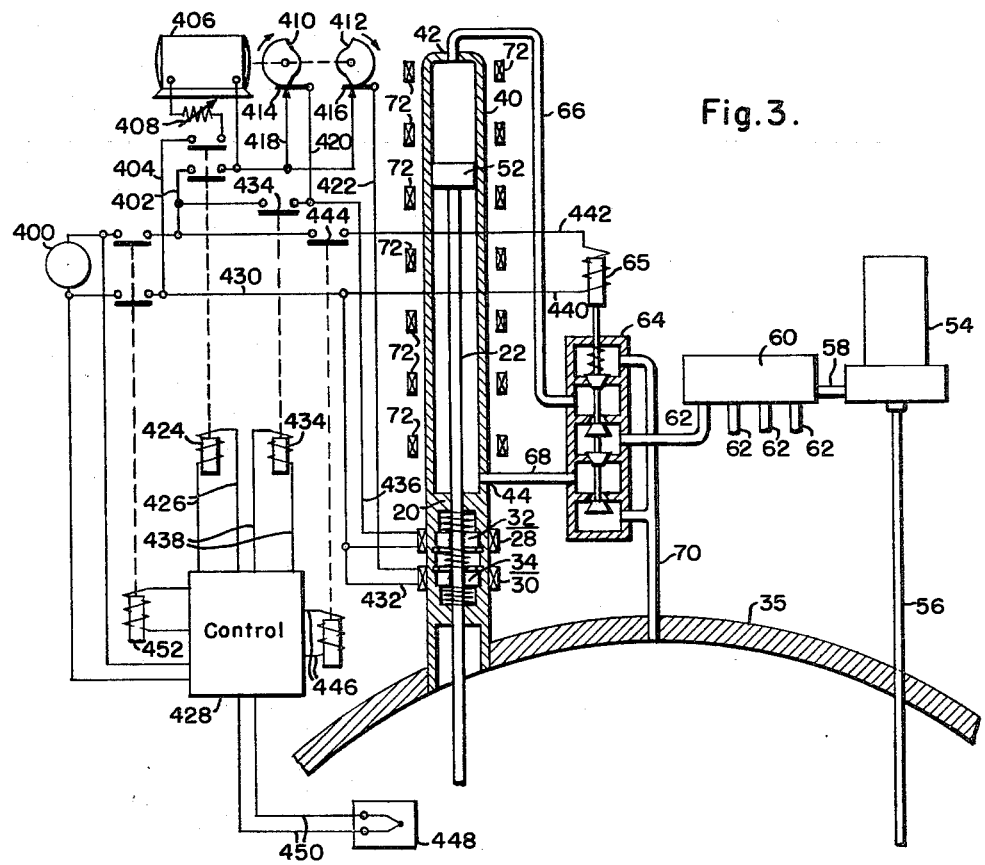
FIG. 3 is a schematic view, partly in section, representing one application of the linear motion device disclosed herein as associated with a sealed or pressurized vessel, e.g., an atomic reactor.
FIG. 12 is a table showing actuation of the latching or gripping means, and the force-applying means of the linear motion device during various operating conditions thereof.

In contemplation of the invention a linear motion device is arranged such that a comparatively large force is applied continuously during operation thereof to the armature or control element actuated in a given direction by the device. The arrangement is such that the continuous force can be applied in either direction of the intended linear movement of the armature or control element and over a comparatively extended travel of the armature or control element. The application of the force is arranged so that the direction thereof can be readily and quickly changed in order that the direction of movement of the control element can be easily reversed. Two or more incremental motion controlling, or latching, clutching or gripping means, are arranged for alternate engagement with the control element or other linearly moving element in order to introduce a finely controlled incremental movement to the linear element. It is within the contemplation of the invention that by suitably restricting the movement of the latching or gripping devices to a predetermined amount the individual motional increments of the linear element likewise can be predetermined. In other aspects of the invention it is contemplated that the aforesaid force and latching or locking devices can be so actuated that a large increment or quick movement of the linear element can be effectuated to a given point in either direction of travel of the linear element. The structural organization is such that a relatively heavy linear element can be actuated vertically either against or reinforced by the action of gravity with the same minute degree of control as indicated heretofore. In one exemplary application of the linear motion device disclosed herein, the linear element is arranged to "fail safe," that is to say, to move to a predetermined position of the linear element, upon accidental disruption of electrical power supplied to the linear motion device.

Referring now more particularly to FIGS. 1 to 3 of the drawings, the exemplary embodiment of the invention disclosed therein comprises a generally tubular housing 20 and a linear control element or armature 22 mounted for linear movement within and longitudinally of the housing 20. Fixedly mounted along the length of a lower portion 24 of the housing is a plurality of solenoid-containing annuli 26, with two being shown in this example of the invention. Each of the containing annuli 26 is arranged to enclose an electrical solenoid coil 28 or 30 mounted individually adjacent an associated locking, latching, or gripping device indicated generally by the reference characters 32 and 34, respectively, and described hereinafter in greater detail. It will be appreciated that any suitable mechanical, hydraulic, or pneumatic means can be employed to actuate the latching means 32 and 34 and that, inasmuch as those specific forms of latching devices described hereinafter are exemplary in nature, any suitable latching device can be utilized in their stead, in accordance with this invention. The lower housing portion 24 is secured at its lower end to a pressurized or other sealed vessel 35, and if desired, is hermetically sealed thereto by means of an annular sealing weld 36.

The linear element 22 is positioned for linear movement thereof relative to the housing 20 by means of an inwardly extending collar or flange 37 formed, in this example, integrally with the housing 20 and adjacent the lower end thereof. The central aperture 38 of the collar 37, through which the linear element 22 extends, is provided with packing material 39 in order to minimize leakage of fluid from or to the sealed vessel 35 through the aperture 38.

The upper portion of the tubular housing 20 is formed into an elongated hollow cylinder 40, which is provided with a port 42 or 44 adjacent each end thereof. It is contemplated by the invention that the cylinder 40 is to be approximately equal in length to the desired extent of linear travel of the linear element 22. The cylinder 40 is separated from the remainder or lower portion 24 of the housing 20 by means of an inwardly extending annular flange or collar 46. The collar 46 is provided with a central aperture 48, in alignment with the aforesaid collar aperture 38 and through which the linear element 22 likewise is inserted. The collar 46 also is provided with suitable packing material 50 in order to minimize leakage through its central aperture 48 and past the linear element 22.

Secured to the upward end of the linear element 22 is a double-acting piston member 52 arranged for linear movement in and along the length of the cylinder 40. The piston 52 is secured to the linear element 22 by means of a bolt 53 or other suitable fastening means, and relatively closely fits within the cylinder 40. Suitable means are provided for introducing a pressurized fluid into one of the ports 42 or 44 in order to effect movement of the linear element 22 in the downward or upward direction of travel, respectively. Where the linear element 22 is arranged for vertical movement thereof as illustrated in the drawings, the aforesaid pressurized fluid, in the case of a relatively heavy linear element 22, need only be introduced into the lower end of the cylinder 40 by way of the port 44 to induce upward movement of the linear element 22. In this arrangement downward movement of the linear element, of course, can be induced by the influence of gravity.

In other applications of the linear motion device, means are provided also for introducing pressurized fluid into the upward end of the cylinder 40 by way of the port 42. When the forces of friction, caused by the engaging parts of the linear motion device and acting upon the linear element 22, are greater than the gravitational force thereof, the aforesaid pressurized fluid introducing means is desirable for use in those cases in which the linear element accidentally becomes lodged or struck within the housing 20 or the pressurized vessel 35, or when a more rapid movement is desired than that afforded by the action of gravity.

In the application of the invention for use within a sealed system, as represented in FIG. 3 by the sealed vessel 35 to which the sealed housing 20 is secured, one form of pressurized fluid introducing means comprises a canned motor-pump unit 54 having a suction line 56 extending through the wall of the vessel 35 into the interior thereof and having an outlet conduit 58 connected to pressure manifolding means 60. The pressure manifolding means is provided with a plurality of outlets 62 each of which is coupled to the cylinder 40 of a linear motion device constructed in accordance with the invention, with one being shown in FIG. 3 for purposes of illustration. More particularly, the manifolding outlet 62 is coupled to the ports 42 and 44 of the cylinder 40 by means of conduits 66 and 68, respectively, and a four-way valve 64, which is actuated by a solenoid 65. The remaining valve opening is coupled by way of a conduit 70 with the interior of the pressurized vessel 35.

The valve 64 is so arranged that the pressurized fluid accumulated in the manifolding means 60 by the motor-pump unit 54 can be inletted by way either of the ports 42 or 44 of the cylinder, by suitable operation of the valve, in order to drive the double-acting piston 52 disposed therein downwardly or upwardly, respectively. With this arrangement, when the valve 64 is manipulated to admit pressurized fluid into the upper end of the cylinder 40 by way of the port 42, the fluid in the lower portion of the cylinder 40 is exited through the port 44, the valve 64 and the conduit 70 into the pressurized vessel 35. On the other hand, when the valve 64 is manipulated such that pressurized fluid is emitted into the lower portion of the cylinder 40, by way of the inlet 44, the fluid contained in the upward portion 40 is exited by way of the conduit 66, the valve 64 and the conduit 70 into the pressurized vessel 35. It will be appreciated that the motor pump 54 is adapted to withdraw fluid under pressure from the vessel 35, in the event the latter is pressurized, and to raise it to such higher pressure within the manifolding means 60 sufficient for the operation of the double acting piston 52. For operation in a hermetically sealed system the motor pump 54 is provided in the form of a hermetically sealed unit such as that disclosed in a copending application entitled "Totally Enclosed Canned Motor Pump" of Cametti and Hagg filed July 1, 1954, S.N. 440,628, now Patent No. 2,887,061 and assigned to the assignee of the present application.

As indicated heretofore, a plurality of the linear motion devices can be associated with the pressurized vessel 35 and each can be adapted to manipulate a linear element 22 associated with each of the linear motion devices and adapted for insertion into the interior of the pressurized vessel 35 to control a process or reaction maintained therewithin. The position of each linear control element 22 relative to the pressurized vessel 35 desirably is indicated by a plurality of position indicating coils 72 disposed in this example along the entire length of the cylinder 40. The coils 72 are coupled to appropriate conventional electrical circuitry for operating suitable known indicia when the passage of the double-acting piston 52, or of the linear element 22, relative to the indicating coils 72 changes the inductance thereof and thereby produces a change in the electrical circuit, which change is employed to actuate the aforesaid indicia. In this latter arrangement the piston or the linear element 22 is constructed at least partially from a magnetic material. Alternatively or in conjunction with the position indicating coils, the position of the linear element 22 can be precisely shown by counting the operations of the gripping or incremental motion controlling means presently to be described. It is contemplated that the aforesaid counting means can be coupled to a suitable scale to show in conjunction with the manipulation of the valve 64 the number of increments traveled in either direction of the linear element 22.

In one application of the invention the aforesaid gripping or incremental motion controlling means are arranged in pairs in order to alternately grip and release the linear element 22 which is driven by the piston 52 in a given direction. Suitable stop means are associated with each of the gripping devices to limit the individual movements thereof and are so arranged that each incremental motion of the linear element is limited to an extent necessary to impart a fine degree of control over the motion of the linear element 22 and consequently over the operation or process being controlled by movement of the linear element. Thus, a stepwise movement of the linear element 22 is effected with the linear element being in engagement at all times with one or another, alternately, of the gripping devices.

Referring now more particularly to FIGS. 1 and 2 of the drawings, the illustrative form of gripping device 32 or 34 illustrated therein each comprises a solenoid armature member 80 fabricated in the form of an annulus from a magnetic material and relatively closely fitting within the lower housing section 24 where the armature members are disposed adjacent the solenoid coils 28 and 30, respectively. Mounted between each of the solenoid armatures 80 and a retaining member 82 having a tubular bearing extension 84 is a segmentized gripping collar 86. The individual segments 96 of each gripping collar 86 are supported between a solenoid armature 80 and its tubular bearing extension 84 by suitable anti-frictional means comprising the ball bearings 88. The segments of each gripping collar 86 are arranged in a form of an annulus having a central opening 90 (FIG. 2) which is aligned with central openings 92 and 94 in its solenoid armature 80 and retaining member 82, respectively, through all of which openings the linear element 22 extends. Inserted into suitable aligned recesses formed in each adjacent pair of the gripping collar segments 96 is a compressed spring 98 adapted to open the gripping collar 86 by outwardly expanding or separating the segments 96. The gripping segments 96 are pressed into latching engagement with the linear element 22 by movement of an outer locking sleeve 100 toward the solenoid armature 80 when the coil 28 or 30 is energized. During such movement, the sliding engagement of an inwardly extending inclined surface 102 of the locking sleeve with similarly inclined outwardly extending surfaces of the gripping segments 96 causes the segments to be moved inwardly against the action of the springs 98 to engage the serrated or ribbed surfaces 104 and 106 of the linear element 22 and of the gripping segments 96, respectively. When the coil 28 or 30 is deenergized, a compressed locking sleeve spring 108 inserted into aligned annular recesses formed in the solenoid armature 80 and the locking sleeve 100, respectively, returns the locking sleeve to its normal position of abutting engagement with the retaining member 82 as illustrated by the non-gripping position of the gripping means 32.

Each of the gripping means 32 and 34 is urged normally into abutting engagement with the stopping rings 110 and 112, respectively, by individual compressed armature springs 114 and 116 inserted between the upper housing flange or collar 46 and the lower housing flange or collar 37 and the associated solenoid armature 80. Each of the retaining members 82 of the gripping devices 32 and 34 are urged into engagement with the segmented collar 86 and the anti-frictional means 88 by means of a compressed retaining spring 118. The retaining spring is positioned between the retaining members 82 by means of a spring positioning tubular extension 119 secured to each of the retaining members 82. In this example the outward corners of each of the spring positioning extensions 119 are rounded off to minimize frictional engagement thereof with the spring 118. It will be seen, then, that in this example of the invention the gripping means 32 and 34 are substantially similar, and that the solenoid armature 80, the segmented collar 86 and the retaining member 82 of each gripping means are arranged for movement as a unit between the stopping ring 110 or 112, respectively, and upper and lower shoulders 120 and 122, respectively, formed in the wall of the lower housing section 24. In the exemplary form of the invention shown in FIGS. 1 and 2 the upper gripping means 32 is illustrated in its unlatched or non-gripping position in which the armature spring 114 urges the retaining member and associated components of the gripping means downwardly to its normal position against the stopping ring 110. At the same time the locking sleeve spring 108 urges the locking sleeve 100 downwardly to its normal position against the upward surface 124 of the retaining member 82.

For purposes of operational explanation it will be assumed that a pressurized fluid is introduced into the upper portion of the cylinder 40 by way of the port 42 as indicated by arrow 126 (FIG. 1), or alternatively, that the weight of the linear element 22 is sufficient, in the vertical position thereof, to urge the linear element downwardly in the manner to be described. With the upper gripping device 32 in its unlatched position as shown, the lower gripping device 34 is actuated, by energizing the solenoid coil 30, to a position of latching engagement of its segmentized collar 86 with the serrated surface 104 of the linear element 22. The pressure indicated by the arrow 126 or the weight of the linear element, if the housing 20 is disposed vertically, causes the linear element 22 and the latched gripping device 34 to move downwardly against the action of the armature spring 116. The linear element 22 and the armature 80 and associated components of the lower gripping device 34 are moved thusly through an increment of motion X (FIG. 1) until the armature engages the lower shoulder 122 of the lower housing section. At this point the solenoid coil 28 of the upper gripping device is energized to cause the upper gripping device to engage the linear element 22 whereupon both the upper gripping device and the linear element are secured in this stationary position by abutting engagement of the retaining member 82 of the upper gripping device with the stopping ring 110. The lower solenoid coil 30 then is deenergized and the lower gripping device 34 is returned to its normal position against the stopping ring 112 by expansion of the armature spring 116.

At this latter position of the lower gripping device the solenoid coil 30 is again energized to cause the segmentized collar to engage the linear element 22 and upon deenergizing the upper solenoid coil 28 and release of the segmented collar of the upper gripping device the pressure 126 or the weight of the linear element 22 causes the linear element and the lower gripping device 34 engaged therewith to move downwardly for an additional increment of motion X. In this manner, the gripping devices 32 and 34 are actuated alternately until the desired extent of travel of the linear element 22 is attained. As indicated heretofore, the increment X can be preselected from any value within the structural limits of the linear motion device by suitable disposition of the stopping rings 110 and 112. During movement of the linear element 22 the retaining member 82 and the bearings 88 of each gripping device 32 or 34 are maintained always in engagement with the associated segmentized collar 86 by means of the retaining spring 118.

When it is desired to move the linear element in the opposite direction, or upwardly in the case the linear motion device is arranged vertically, pressurized fluid is admitted into the lower portion of the cylinder 40 by way of the port 44 as indicated by arrow 128. During upward movement of the piston 52 and the linear element 22, the fluid accumulated in the upward portion of the cylinder 40 is exited by way of the conduit 66, the valve 64 and the conduit 70 into the pressurized vessel 35, as explained heretofore with particular reference to FIG. 3 of the drawings. During upward movement of the linear element 22 the relative positions of the gripping means 32 and 34 will be reversed from those occupied by these gripping means during downward movement of the linear element with the result that the lower gripping means 34 will be positioned continuously against the associated stopping ring 112, and the upper gripping means 32 will be moved upwardly through an increment of travel Y by the force of the pressurized fluid 128 exerted against the underside of the piston 52 when the gripping means is actuated into latching engagement with the linear element 22, and in the reverse direction by the upper armature spring 114 when the gripping means is unlatched.

Obviously, the increment of travel Y can be made equal to the increment of travel X, as in this example of the invention, or alternatively, unequal or different increments can be selected depending upon the operational requirements of the linear motion device.

It will be apparent from the foregoing description that the use of the solenoid-operated gripping means 32 and 34 in conjunction with the piston and cylinder arrangement 52 and 40 permits the employment of much smaller gripping means than otherwise would be required to overcome the internal friction of the linear motion device, and the weight of the linear element where the device is disposed vertically, than if the main force required to move the linear element 22 were not supplied, independently of the gripping means 32 and 34, by the aforesaid piston and cylinder arrangement.

Referring to FIG. 12 and once again to FIG. 3 of the drawings, one form of an electrical circuit arrangement arranged for operating the solenoid valve 64 and for selectively energizing the solenoid coils 28 and 30 of the gripping means is depicted schematically therein. The aforesaid electrical circuitry is adapted for selectively operating the solenoid valve 64 and the gripping devices 32 and 34 in accordance with a varying characteristic, for an example temperature, of the process or operation being carried out within the pressurized vessel 35. As better shown in FIG. 12, in one application of the invention, the solenoid coils 28 and 30 (FIG. 1) are energized (E) alternately in either direction, while the four-way valve 64 (FIG. 3) is so arranged that upon energizing its solenoid 65 pressurized fluid is admitted through the lower port 44 of the cylinder 40 to urge the linear element 22 upwardly, in this case. However, in the event of power failure resulting in deenergizing (DE) all of the solenoids 65, 28 and 30 as indicated in the second column of the table in FIG. 12, the linear or control element is free to move, by its own weight or by the residuum of pressurized fluid accumulated within the manifold 60 and admitted through the upper port 42 of the cylinder, downwardly into the pressure vessel 35. Thus, the linear element automatically is "scrammed" or moved rapidly, to a preselected position relative to the vessel 35 and determined by a suitably placed stop (not shown), where it will terminate or otherwise appropriately control the reaction or operation being carried on within the pressurized vessel 35. A faster scram can be attained if desired by use of suitable spring biasing means (not shown) to urge the piston or linear element downwardly or by the use for the same purpose of a well-known hydraulic accumulator arranged to discharge into the manifold 60 or the top portion of the cylinder 40.

As will be explained hereinafter, the electrical circuitry of FIG. 3 is arranged such that the solenoids 65, 28 and 30 also can be operated manually or automatically in response to a varying characteristic of the aforesaid reaction or operation and in either a simultaneous or other suitable configuration, for appropriately controlling the direction and rate of movement of the linear element 22.

As stated heretofore, one form of the aforesaid electrical controlling circuit is shown schematically in FIG. 3 of the drawings, and includes a source of electric potential 400 coupled to the bus lines 402 and 404. A cam switch driving motor 406 is connected to the bus lines in series with a variable resistance 408, which is adapted to adjust the voltage and hence the speed of the motor 406. A pair of rotatable cam members 410 and 412 are coupled to the motor 406 and are arranged intermittently to close switches 414 and 416 which are connected in series-parallel relationship with the solenoid coils 28 and 30, of the gripping means 32 and 34, to the bus line 402 via the conductors 418, 420 and 422, respectively. The cam members 410 and 412 are mounted for common rotation by the motor 406 and have their rise and dwell portions 180° out of phase, as it were, in order to provide alternate operation of the gripping means 28 and 30. Operating potential is applied simultaneously to the driving motor 406 and the switches 414 and 416 by closing a relay-actuated switch 424, which is coupled via conductors 426 to a suitable central controlling means 428. The electrical circuit through the solenoid coils 28 and 30 of the upper and lower gripping means is completed by way of conductors 430 and 432.

In order to hold the linear element 22 in a given stationary position in its travel, means are provided for actuating at least one of the gripping means 32 and 34 to the latching position thereof independently of the cam switches 414 and 416. In this arrangement, the cam switch 414 coupled to the solenoid coil 28 of the upper gripping means 32 (FIG. 1) is by-passable through a relay-operated switch 434 and a conductor 436. The upper gripping means 32 is selected for holding (FIG. 12) the linear element 22 in order to avoid compressing the armature spring 116 (FIG. 1) of the lower gripping means 34 for extended periods. The relay-actuated switch 434 is coupled via conductors 438 to the central controlling means 428.

As pointed out heretofore, the direction of travel of the linear control element 22 is controlled by the solenoid-operated valve 64, which is arranged to admit pressurized fluid into either end of the cylinder 40. The solenoidal valve is further arranged so that, when its solenoid 65 is deenergized, the fluid can enter the upper part of cylinder 40 and the fluid in the lower portion thereof can escape to the vessel 35 or to a suitable drain. The solenoid 65 is connected across the bus lines 402 and 404, via conductors 440 and 442 in series with a relay-actuated switch 444, which is coupled, in turn, to the central controlling means 428 through conductors 446.

In the operation of the invention as applied in conjunction with a sealed system and as illustrated in FIG. 3 of the drawings, the canned motor pump 54 is operated to develop pressure within the manifold 60. Depending upon the desired direction of travel, the switch 444 is closed to cause the valve 64 to admit fluid into the lower port 44 of the cylinder 40 to urge the piston 52 and the linear element 22 upwardly, or conversely, the switch is left in its open circuit position whereby the valve 64 in its normal position admits fluid into the upper port 42 of the cylinder 40 to urge the piston and linear element downwardly. The switch 424 then is closed to energize the driving motor 406 and the cam switches 414 and 416 for the intermittent and alternate operation of the gripping means 32 and 34, as explained heretofore in connection with FIGS. 1 and 2 of the drawings. The linear element will then move downwardly through successive increments of travel X (FIG. 1) or upwardly through successive increments Y. The direction of travel selected will depend upon the setting of the four-way solenoid valve 64, as indicated in the table of FIG. 12. The speed of travel in either the upward or downward direction can be varied obviously by adjusting the variable resistance 408. At any desired point during the upward or downward travel of the linear element 22, the latter can be stopped or held by closing the switch 434 to actuate continuously the upper gripping means 32. At the same time, the motor 406 and the cam switches 414 and 416 desirably are deenergized by opening the switch 424. When it is desired that the linear element 22 be moved rapidly or "scrammed" in either direction, the switches 424 and 434 are both deenergized and the switch 444 is actuated to its open or closed position depending upon whether downward or upward movement of the linear element is desired. For emergency scram downwardly a line relay-actuated switch 452 is provided for opening the circuits to all of the switches 424, 434 and 445 simultaneously.

It has already been pointed out that, in various applications of the invention, the linear control element 22 can be moved in accordance with a varying characteristic. Assuming non-limitatively, then, that the varying characteristic is the temperature of the reaction or process occurring within the pressurized vessel 35, a suitable thermocouple or other temperature sensitive element 448 is inserted into the vessel and is coupled via leads 450 to the central controlling means 428. In one circuit arrangement, the central controlling means 428 is provided in the form of a conventional control panel, and the thermocouple 448 is coupled to a visual meter or recorder (not shown). The switches 424, 434 and 444 can then be mounted on the panel for manual operation thereof, or alternately, their electromagnets can be remotely energized by suitable manual switches likewise mounted on the panel. Obviously, a plurality of linear motion devices can be provided for the vessel 35 and can be actuated either simultaneously or separately in the aforedescribed manner.

Instead of a manual control panel, the central controlling means 428 can comprise a control circuit having conventional circuit means made sensitive to a given lower limit of temperature for closing the switch 444 for upward movement of the linear element 22 and similar means for opening said switch for downward movement when a given upper limit of temperature is reached. Additional circuit means made sensitive to narrower limits within the first-mentioned limits can be arranged to close switch 434 and thereby to hold the linear element in a stationary position for the purpose of minimizing hunting between the first-mentioned temperature limits. Still other circuit means can be provided and arranged to open switch 452 whenever a dangerously high temperature area above the first-mentioned upper temperature limit is approached, with the result that an automatic emergency scram of the linear element in its downward direction is afforded.

In FIG. 4 of the drawings, another form of gripping device constructed in accordance with the invention is illustrated, which gripping device is adapted for use in the organization shown in FIGS. 1–3. The latter form of gripping device therefore can be used in pairs, and accordingly only the lower gripping device 34' is illustrated in FIG. 4 of the drawings. In this example the solenoid coil 30' is disposed adjacent a solenoid armature 130 mounted for movement between the lower housing shoulder 122' and the stopping ring 112'. The solenoid armature 130 comprises a lower, body portion 132 and an outwardly arranged, upwardly extending tubular section 134. The tubular section 134 is threaded at its end portion 136 on the inner surface thereof and both the tubular projection 134 and the body portion 132 of the solenoid armature fit relatively closely within the lower housing section 24'. Threaded within the armature extension 134 is a retaining member 138 having an inwardly extending tubular section 140. The segmented collar 86' is mounted on anti-frictional means 88' between the body portion 132 of the solenoid armature and the tubular section 140 of the retaining member 138.

An outer locking sleeve 142 is arranged to engage the segmentized collar 86' in a manner described heretofore in connection with the outer locking sleeve 100 of FIGS. 1 and 2 of the drawings. The outer locking sleeve 142 is provided with an inwardly disposed, annular shoulder 144 which is adapted to position the locking member spring 108' inserted into a recess formed in the body portion 132 of the solenoid armature. In this latter arangement of the invention, the retaining spring 118 positioned between the retaining members 82 (FIG. 1) can be eliminated, inasmuch as the retaining member 138 (FIG. 4) is connected positively to the solenoid armature 130 by means of the armature projection 134. This latter feature is likewise true in connection with each of the forms of gripping means presently to be described in connection with FIGS. 5 to 10 of the drawings when used in the organization illustrated in FIG. 1.

Referring now to FIG. 5 of the drawings, the illustrative form of the gripping device shown therein comprises the lower solenoid coil 30' and a solenoid armature 146 through a central aperture 148 of which is inserted the elongated tubular extension 150 of a lower retaining member 152. The outer surface of a portion of the tubular extension 150 is threaded adjacent the upper end thereof for threadedly engaging an annular upper retaining member 154. The upper and lower retaining members 154 and 152 and the solenoid armature 146 fit relatively closely within the wall of the lower housing section 24'. Disposed about the periphery of the tubular extension 150 of the lower retaining member are one or more rows of slots 156, with one row being shown in this example of the invention and each row being disposed in a plane parallel to the serrations or ribs 104' arranged along the length of the linear element 22'.

Mounted within the field of the solenoid coil 30' is an outer locking sleeve 160 fabricated from a magnetic material and adapted for movement along the length of the tubular extension 150. The locking sleeve 160 is formed with an annular shoulder 162 at the lower surface thereof which serves to position the locking sleeve spring 108' inserted into a recess formed in the solenoid armature 146. For engaging the serrations 104' provided about the periphery of the linear element 22', a ball 164 is inserted into each of the slots 156, which extend through the wall of the tubular extension 150. The balls 164 are positioned within the slots 156 by means of a hardened insert 166, not necessarily fabricated from a magnetic material, inserted into a widened portion 168 of the central aperture of the locking sleeve 160. The inner wall of the hardened annular insert 166 is tapered outwardly adjacent the bottom end thereof, as indicated by the reference character 170, in order to provide a camming surface for inward and outward movement of the balls 164. Thus, when the solenoid 30' is energized, the locking sleeve 160 will be drawn downwardly against the action of the locking sleeve spring 108' to the position as illustrated in FIG. 5. Upon deenergization of the solenoid coil 30', the locking sleeve spring 108' will move the locking sleeve 160 to its normal position of engagement with the underside 172 of the upper retaining member 154. With the locking sleeve in its latter or inoperative position, the inclined surfaces of the linear element serrations 104' will cam the balls 164 outwardly and out of engagement with the linear element 22' when the latter is moved in either the upward or downward direction of its travel.

Movement of the gripping means illustrated in FIG. 5 is limited by engagement of the upper and lower retaining members 154 and 152 with the stopping ring 112' and the lower housing shoulder 122', respectively. As indicated heretofore another gripping device substantially similar to that in FIG. 5, when used with the organization of FIGS. 1–3, is inverted and is disposed between the stopping ring 110 and the upper housing shoulder 120 (FIG. 1). Alternatively, the gripping device of FIG. 5 or another of the gripping devices illustrated herein can be paired in similar manner with any one of the gripping devices disclosed herein, in those applications where differing gripping forces might be required in different directions of movement of the linear element 22.

Referring now to FIGS. 6 and 7 of the drawings, another form of gripping means contemplated by the invention is shown therein. In this latter form of the invention, a lower housing section 180 of the linear motion device is formed with a pair of widened portions 182 disposed along the length of the lower housing section, with one being shown in this illustration of the invention. The lower housing section 180 is connected at its upward end to a cylinder substantially similar to the cylinder 40 illustrated in FIGS. 1 and 3 of the drawings. This later arrangement of the invention is adapted to operate in connection with the linear element 22' and a piston 52 (FIG. 1) in a manner similar to that described heretofore.

Inserted into each of the widened portions 182 of the lower housing section 180 is an annular retaining member 184 having the cross section thereof which lies in a plane containing the axis of the retaining member shaped substantially like a C. The retaining member 184 is adapted to move the linear element 22' between stops 186 and 188 forming respectively the upper and lower inward limits of the widened housing portion 182. Mounted within the semiclosed cavity of the retaining member 184 and positioned centrally thereof by means of thrust bearings 190 are a pair of pinion members 192 and 194. The pinion members are spacedly coupled by means of the cam follower pins 196 which are equal in number to the number of the segments of a segmentized gripping collar 198 presently to be described.

The segmentized gripping collar 198 is mounted for movement between the pinion members 192 and 194. In this example of the invention, two such gripping collar segments 200 and 202 are utilized, each having a camming slot 204 formed therein. The cam follower pins 196 are inserted individually through the camming slots 204, and the slots are arranged eccentrically of the linear element 22' and of a central opening 206 in the segmentized gripping collar 198, such that annular movement of the pinion members 192 and 194 and pins 196 effect inward or outward movement of the gripping collar segments 200 and 204. Radical alignment of the gripping collar segments is effected by the pin and hole arrangements indicated generally by the reference character 205.

Suitable annular bearing guide grooves 208 and 210 are formed on the inner surface of the retaining member 184 and the outer surface of the pinion members respectively in order to serve as a guide for rotational movement of the pinion members 192 and 194. Each of the gripping collar segments is notched at the inward edge thereof to form the central gripping collar cavity 206 and to provide thereby an increased surface of engagement with the linear element 22'. Each of the notched portions of the segments 200 and 202 is ribbed or serrated to afford latching engagement of the gripping segments with the serrated surface of the linear element 22'.

As illustrated in FIG. 7 of the drawings, the widened portion 182 of the lower housing section is provided with a suitable recess 212 into which a rack 214 is inserted. The recess 212 opens into the central cavity 216 of the lower housing widened portion 182 in order that an adequate area is provided for meshing engagement between the rack 214 and the pinion members 192 and 194.

In those applications wherein the linear motion device is employed within a sealed system, the rack 214 and a solenoid armature 218 secured thereto are mounted within a sealed envelope 220 secured to the housing widened portion 182 and communicating with the aforesaid recess 212. A solenoid coil 222 is mounted on the exterior of the envelope 220 and disposed adjacent the solenoid armature 218. Upon energization of the solenoid coil 222, the armature and rack are pulled to the left against the action of a compressed armature spring 224, to the position illustrated in FIG. 7. The aforesaid motion of the rack 214 produces a counterclockwise movement of the pinion members 192 and 194 which forces the cam follower pins 196 against the edges of the slots 204 and causes the gripping collar segments 200 and 202 to move radially inwardly into latching engagement with the linear element 22'. Upon deenergizing the solenoid coil 222, the armature spring 224 returns the armature 218 to its normal position against a shoulder 226 formed adjacent the inward end of the sealed envelope 220. This latter movement of the armature 218 and the rack 214 imparts a clockwise movement to the pinion members 192 and 194 thereby causing the gripping collar segments 200 and 202 to move radially outwardly, to their normally inoperative positions. When the segmentized gripping collar 198 is thus disengaged, the compressed armature spring 228 disposed between a lower housing flange 230 and the retaining member 184 moves the retaining member 184 to its normal position in engagement with the upper shoulder 186 of the widened housing portion 182. Thus, an increment of travel X is imparted to the linear element 22', which increment is determined by the distance between the shoulders 186 and 188 of the widened housing section 182 and the width of the C-shaped retaining member 184.

Referring now to FIGS. 8 to 10 of the drawings, the exemplary forms of gripping means shown therein are each adapted for engagement with a linear element 232 having a flat surface 234 provided along the length thereof. The flat surface is provided with a number of transverse ribs or serrations 236 which are adapted to be engaged by similar serrations 238 provided on an inwardly extending face of a gripping member 240. The linear element 232 is inserted through a central aperture 242 of a retaining collar 244. An opening 246 is formed in the central tubular portion 248 of the collar and communicates with the aforesaid aperture 242, through which opening the gripping member 240 is inserted for engagement with the linear element 232.

The gripping member 240 is mounted for movement relative to and between the upper and lower flanges 250 and 252, respectively, of the retaining member 248, by anti-frictional means such as the ball bearings 254 and the associated bearing races 256 and 258, which bearing races are provided respectively on adjacent portions of the gripping member and of the retaining member flanges 250 and 252. Thus, when the gripping member 240 is moved into engagement with the serrated surface 234 of the linear element, by means presently to be described, the linear element, the gripping member 240 and the retaining member 248 are moved unitarily from a position whereat the upper flange 250 of the retaining member normally engages stopping ring 260 to the position shown in FIG. 8 of the drawings where the lower flange 252 of the retaining member 248 comes to rest against a shoulder 262 provided in the wall of a lower housing section 264. The linear element 232 is coupled adjacent its upward end thereof to a piston similar to that described in connection with the piston 52 (FIG. 1) and is disposed in a suitable cylinder such as the cylinder 40 of FIG. 1. Upon outward movement and disengagement of the gripping member 240 from the linear element 232, the retaining member and associated parts are returned to the normal position thereof against the stopping ring 260 by a compressed spring 266 positioned between a lower housing flange or collar 268 and the retaining member 248.

One arrangement for effecting lateral movement of the gripping member 240 relative to the linear element 232 is exemplified in FIG. 8 of the drawings and comprises a pair of pivotally connected toggle members 270 and 272, the free ends of which are pivoted respectively to the end wall of an envelope 274 and to the gripping member 240. A connecting link 276 is secured to the toggle members 270 and 272 at the pivoted connection therebetween, and the other end of the link 276 is coupled to a solenoid armature 278. The armature 278 is adapted to fit relatively closely within a second envelope member 280, the interior of which communicates with the cavity of the first-mentioned envelope member 274. When the linear motion device is coupled into a hermetically sealed system, the envelope member 280 can be hermetically sealed to the envelope 274 which, in turn, can be hermetically sealed to the lower housing section 264, by the annular sealing welds 282 and 284, respectively.

A solenoid coil 286 is disposed on the exterior surface of the envelope member 280 at a position adjacent the solenoid armature 278. Upon energizing the solenoid coil 286, the armature is urged downwardly against the action of a compressed armature spring 288 to expand the outward ends of the toggle members 270 and 272 and, in turn, to cause the gripping member 240 to move to the right to a position of engagement thereof with the linear element 232. Upon deenergizing the solenoid coil 286, the armature spring 288, which is disposed between a shoulder 290 disposed adjacent the lower end of the envelope member 280 and the solenoid armature 278, operates to urge the armature upwardly thereby contracting the toggle members 270 and 272 and moving the gripping member 240 to the left to the normal or at rest position thereof as determined by portions 292 of the lower housing section wall.

Another arrangement for effecting lateral movement of the gripping member 240 for engagement and disengagement thereof with linear element 242 is illustrated in FIG. 10 of the drawings. In this latter arrangement, the gripping member 240 is actuated by a pilot piston and cylinder arrangement which can be actuated if desired from the pressure manifolding means 60 illustrated in FIG. 3 of the drawings or other suitable pressurizing means. In this arrangement then, pressurized fluid is conducted into the cylinder 298 by way of a conduit 294 and a three-way solenoid-controlled valve 296. The solenoid valve 296 is adapted in one position thereof to emit pressurized fluid into the outward end of the cylinder by way of the conduit 300 or in the other position of the valve to equalize, by way of the conduit 302, the pressure on either side of a piston 304 which is positioned within the cylinder 298. Thus, when the valve is actuated to the position thereof indicated by the arrow 306, pressurized fluid is admitted to the outward portion of the cylinder 298 thereby urging the piston 304 and the gripping member 240 coupled thereto by means of a pivoted link 308 to the right until the gripping member engages the linear element 232. Upon deenergizing the solenoid-actuated valve, a suitable spring or other biasing means causes the valve 296 to be actuated to the position thereof indicated by the arrow 310, whereby the pressures existing on either side of the piston 304 within the cylinder 298 are equalized by way of the conduit 302. As a result of this operation, a compressed piston spring 312 disposed between the piston 304 and a flange member 314 secured to the inward end of the cylinder 298, moves the piston 304 and the gripping member 240 to the left to its normal position.

Referring now to FIG. 11 of the drawings, another exemplary arrangement of the invention is shown therein and is adapted for operation with the linear control element 22 and the piston 52, which are positioned within an elongated cylinder 320 and a housing section 322 by means of an inwardly extending flange or collar portion 324 formed in this example integrally with the cylinder 320 and another inwardly extending collar portion 326 secured to a control element shroud tube 328. A pair of ports 330 and 332 are provided in the wall of the cylinder 320 at positions individually adjacent the ends, respectively, of the cylinder in order to impart a double-acting character to the piston 52 as described heretofore in connection with the cylinder 40 of FIGS. 1 and 3. Suitable packing material 334 is provided at the walls of central aligned openings 336 and 338 provided respectively in the collar portions 326 and 324 for preventing leakage between the interior shroud tube 328 and the cylinder 320.

For operating the linear motion device of FIG. 11 within a sealed system, a continuous cylindrical enclosure 340 is hermetically sealed to the collar portion 326 and to the cylinder 320 by means of annular sealing welds 342 and 344, respectively. The components of the solenoid coil housings 346 and 348 are mounted on the sealed enclosure 340 and suitably spaced along the length thereof by means of spacing rings 350, 352 and 354, respectively. The aforesaid spacing rings and the components of the solenoid coil housings 346 and 348 serve the additional function of reinforcing the sealed enclosure 340 in those applications wherein the linear motion device is employed within a highly pressurized system.

Mounted within each of the housings 346 and 348 is a solenoid coil 356 or 358, with each of the coils being arranged individually adjacent stationary and movable gripping means 360 or 362, respectively. Each of the gripping means 360 or 362 may be fabricated in the form of any one of the gripping devices illustrated in FIGS. 1, 4, 5, 6, 8 or 10, but in this example of the invention are each arranged substantially similar to that illustrated in FIGS. 1 and 2 of the drawings.

The gripping device 360 comprises a stationary armature member 364 which is rigidly secured to the cylindrical enclosure 340 at a position adjacent the solenoid coil 356 and a segmentized collar 366, the individual segments of which are urged into the expanded unlatched position, as shown, by means of latch springs 368 provided individually between adjacent pairs of the segments. The segments of the latching collar 366, when pressed into engagement with the linear element 22, form a central cavity 370 through which the linear element 22 extends. The linear element 22 has a serrated or ribbed surface 372 formed along the length thereof and adapted for engagement with similar serrations 374 formed on the inward walls of the latching segments 376.

As explained heretofore in connection with FIGS. 1, 2 and 4 of the drawings, the latching collar 366 is forced into engagement with the linear element 22 against the action of its biasing springs 368 by means of an outer locking sleeve 378. The locking sleeve 378 is fabricated from a magnetic material and therefore is adapted to move toward the armature member 364 upon energizing the solenoid coil 356. A number of locking sleeve springs 380 are each inserted into pairs of aligned recesses 382 and 384 formed respectively in the stationary armature member 364 and the locking sleeve 378. Upon deenergizing the solenoid coil 356, the locking sleeve springs 380 urge the locking sleeve 378 to its normal or at rest position against the inward surface 386 of the collar member 326.

The movable gripping means 362 in this example of the invention is substantially similar to the stationary gripping means 360, but as indicated heretofore, may be provided in the form of any one of the gripping means disclosed in this application or their equivalents. The gripping means 362 therefore includes a movable armature member 388, the segmentized latching collar 366 and the outer locking sleeve 378. The ribbed central opening 370, through which the linear element 22 extends, of the movable gripping device 362 is aligned with the opening 370 of the stationary gripping device 360. The movable gripping device 362 is arranged for movement between the armature member 364 of the stationary gripping means 360 and the inward face 390 of the inwardly extending cylinder flange member 324 and is normally positioned, in this example of the invention, at a point midway between the stationary member 364 and the cylinder collar 324 by means of opposed compressed conical springs 392 and 396, respectively.

In the operation of the invention in the horizontal position, as arranged according to FIG. 11 of the drawing, the piston and cylinder arrangement 52, 320 and the solenoid coils 356, 358 are energized respectively by hydraulic and electrical circuitry similar to that described heretofore in connection with FIG. 3 of the drawings. Thus, a pressurized fluid is admitted to the outward or right-hand portion cylinder by way of the port 332, after energizing the gripping device 360 to prevent premature movement of the linear element 22. Subsequently, the movable gripping device 362 is energized by the associated electrical circuitry. Upon deenergizing the stationary gripping device 360, the linear element 22 and the movable gripping device 362 engaged therewith are free to move to the left an increment of travel X'. The stationary gripping device 360 is then reactivated to secure the linear element at its new position, and the movable gripping device 362 is deactivated, whereupon it again assumes its normal position midway between the stationary armature member 364 and the collar member 324 by the operation of the conical springs 396 and 392. The foregoing operations are then repeated until the desired extent of travel is imparted to the linear element 22.

In order to induce the linear element 22 to move in the opposite direction of its travel, a pressurized fluid is emitted into the inward or left-hand end of the elongated cylinder 320 by way of the cylinder port 330. The stationary gripping device 360 and the movable gripping device 362 are then actuated intermittently and alternately as explained in the preceding paragraph to produce increments of travel of the linear element 22 equivalent to the distance Y'. It will be appreciated that the increments of travel X' and Y' may be either of equal or of dissimilar intervals depending upon the configuration of the opposed conical springs 392 and 396, as dictated by the application of the linear motion device.

From the foregoing, it will be apparent that a number of novel and efficient forms of a linear motion device have been disclosed herein. The linear motion device is readily adapted for employment within hermetically sealed or highly pressurized systems wherein a finely controlled movement of one or more control elements is required. Furthermore, the linear motion device is readily adaptable during operation thereof to show the exact location of the control element at any given time and to provide for quick and extensive movements of the control element in either direction, depending upon the rate of control which is required in accordance with the characteristics of the process or operation being carried out in the sealed system and controlled by the linear motion device.

Inasmuch as the aforementioned embodiments of the invention are exemplary in nature, numerous modifications thereof will occur to those skilled in the art without departing from the spirit and scope of the invention. Moreover, it is to be understood that certain features of the invention can be utilized without a corresponding use of other features thereof.

We claim as our invention:

1. A linear motion device comprising a movable linear element, means for applying a continuous moving force to said element, a plurality of latching means, each of said latching means being arranged intermittently to engage said linear element, at least one of said latching means being mounted for movement within prescribed limits in a direction generally parallel to that of said moving force, and means for selectively and individually moving said latching means laterally relative to said element into latching engagement therewith.

2. A linear motion device comprising a linear element, means for applying a continuous moving force to said linear element, a pair of latching means, each of said latching means being arranged to engage said linear element intermittently, at least one of said latching means being mounted for movement within prescribed limits in a direction generally parallel to that of said moving force, and means for individually and alternately moving said latching means laterally relative to said linear element into latching engagement therewith.

3. A linear motion device comprising a linear element, means for applying a continuous moving force to said linear element, a plurality of latching means, said latching means being arranged to engage intermittently said linear element, at least one of said latching means being mounted for movement between a pair of stopping members in a direction generally parallel to that of said moving force, means for biasing said last-mentioned latching means to a position between said stopping members, and means for individually and selectively moving said latching means laterally relative to said linear element into latching engagement therewith.

4. A linear motion device comprising a linear element, means for applying a continuous moving force to said linear element, a pair of latching means mounted along the length of said linear element and each being arranged to engage intermittently said linear element, means for mounting one of said latching means for movement between a pair of stopping members in a direction generally parallel to that of said moving force, means for biasing said last-mentioned latching means to a position between said stopping member, and means for individually and alternately moving said latching means laterally relative to said linear element into latching engagement therewith.

5. A linear motion device comprising a linear element, means for applying a continuous moving force in either direction of travel of said element, a pair of latching means mounted along the length of said element and arranged intermittently to engage said element, each of said latching means being mounted for movement between a pair of associated stopping members, means for mounting said stopping members stationarily relative to said element, means for urging each of said latching means to a position between said associated stopping members in a direction generally parallel to that of said moving force, and means for individually and alternately moving said latching means laterally relative to said linear element into latching engagement therewith.

6. A linear motion device comprising an elongated cylinder, a double-acting piston mounted for movement within said cylinder, a linear element coupled to said piston and extending through an end wall of said cylinder, means for mounting said linear element for linear movement thereof, means for admitting a pressurized fluid into each end of said cylinder, a plurality of latching means mounted along the length of said linear element and arranged intermittently to engage said linear element, a pair of stopping members fixedly mounted on said cylinder at least one of said latching means being arranged for movement between said stopping members in a direction generally parallel to that of said moving force, and means for individually and alternately moving said latching means laterally relative to said linear element into latching engagement therewith.

7. A linear motion device comprising an elongated cylinder, a double-acting piston mounted for movement within said cylinder, a linear element coupled to said piston and extending through an end wall of said cylinder, means for mounting said linear element for linear movement thereof, means for admitting a pressurized fluid into each end of said cylinder, a pair of latching means mounted along the length of said linear element and arranged intermittently to engage said linear element, each of said latching means being mounted for movement between a pair of associated stops in a direction generally parallel to that of said moving force, means for fixedly mounting said stops in said cylinder, means biasing each of said latching means to a position between said associated stops, and means for individually and alternately moving said latching means laterally relative to said linear element into latching engagement therewith actuating said latching means.

8. In combination with a hermetically sealed pressurized vessel, an elongated cylinder hermetically sealed to a wall of said vessel and communicating with the interior thereof, a double-acting piston mounted for movement within said cylinder, a linear control element coupled to said piston and extending into said vessel, means secured to the inner wall of said cylinder for positioning said control element for longitudinal movement thereof, pumping means for extracting fluid from said vessel and for transmitting said fluid at a higher pressure to said cylinder, piping connections extending from said pump to said cylinder at positions adjacent each end of said cylinder respectively, valve means coupled in said piping connections for admitting pressurized fluid into either end of said cylinder and for coupling the other end of said cylinder to said vessel, a plurality of latching means mounted within said cylinder along the length of said linear element and arranged intermittently to engage said element, a pair of stops rigidly secured to said cylinder, at least one of said latching means being mounted for movement between said stops in a direction generally parallel to that of said moving force, means for biasing said last-mentioned latching means to a predetermined position between said stops, and means for individually and selectively moving said latching means laterally relative to said linear element into latching engagement therewith.

9. In combination with a hermetically sealed pressurized vessel, an elongated cylinder hermetically sealed to a wall of said vessel and communicating with the interior thereof, a double-acting piston mounted for movement within said cylinder, a linear control element coupled to said piston and extending into said vessel, means secured to the inner wall of said cylinder for positioning said control element for longitudinal movement thereof, means for admitting a pressurized fluid to said cylinder at positions adjacent each end of said piston respectively, a plurality of latching means mounted within said cylinder along the length of said linear element and arranged intermittently to engage said element, at least one of said latching means being mounted for movement between a pair of stops in a direction generally parallel to that of said moving force, means for biasing said last-mentioned latching means to a predetermined position between said stops, and means for selectively actuating said latching means.

10. A linear motion device comprising a linear element, means for applying a continuous moving force to said linear element, a pair of latching means, each of said latching means being arranged to engage said linear element intermittently, one of said latching means being rigidly mounted at a position adjacent the path of said element, the other of said latching means being mounted for movement within prescribed limits in a direction generally parallel to that of said moving force, said last-mentioned latching means being biased to a position intermediate said limits, and means for alternately actuating said latching means.

11. A linear motion device comprising an elongated element mounted for movement in a linear path, means for selectively applying continuous moving forces to said linear element to effect movement thereof in forward and reverse directions respectively in said path, a pair of latching means, each of said latching means being arranged to engage intermittently said linear element, at least one of said latching means being mounted for movement between prescribed limits in a direction generally parallel to that of said moving force, means for biasing said movable latching means to a position between said limits, such that said movable latching means is free to move during either forward or reverse movement of said element, and means for individually and alternately moving said latching means laterally relative to said linear element into latching engagement therewith.

12. A linear motion device comprising a linear element, means applying a continuous moving force to said linear element, a pair of latching means, each of said latching means being arranged to engage said linear element intermittently, a plurality of stops, means for mounting said stops stationarily relative to said element, each latching means being mounted for movement between a pair of said stops in a direction generally parallel to that of said moving force and adjacent the path of said element, at least one of said adjacent latching means in addition being biased against an associated one of said stops, and means for individually and alternately moving said latching means laterally relative to said linear element into latching engagement therewith.

13. A linear motion device comprising an elongated element mounted for movement in a linear path, means for selectively applying continuous moving forces to said linear element to effect movement thereof in forward and reverse directions respectively in said path, a pair of latching means, each of said latching means being arranged to engage said linear element intermittently, a plurality of stops, means for mounting said stops stationarily relative to said element, each latching means being mounted for movement between a pair of said stops in a direction generally parallel to that of said moving force and adjacent the path of said element, both of said latching means being biased respectively against opposed ones of each pair respectively of said stops so that one of said latching means is relatively fixed in position during forward movement of said element while the other is free to move between its stops and said other latching means is relatively fixed during reverse movement of said element while said one latching means is free to move between its stops, and means individually and alternately moving said latching means laterally relative to said linear element into latching engagement therewith.

14. Apparatus for moving a linear element longitudinally comprising a pair of latching means, means coupled individually to said latching means respectively for selectively moving each of said latching means laterally relative to said element into and out of latching engagement therewith, a pair of fixedly mounted stops located in spaced relation along the longitudinal dimension of said element, one of said latching means being located between said stops and movable therebetween in a direction parallel to said longitudinal dimension, biasing means coupled to said one latching means for urging the latter in one direction to engage one of said stops, and means providing a continuous force on said linear element in the direction opposite to said one direction.

15. A linear motion device comprising an elongated element linearly movable substantially along its longitudinal dimension, said element having a plurality of teeth formed on a surface thereof and spaced along said longitudinal dimension thereof, each of said teeth having a portion extending laterally with respect to the longitudinal dimension of said element, a pair of latching means disposed laterally of said element, said latching means each having a portion thereon movable laterally to a position of engagement with at least one of said portions of said teeth, a plurality of stops, means mounting said stops stationarily in spaced relationship along the longitudinal dimension of said element, each of said latching means being mounted between a pair of adjacent ones of said stops for movement therebetween in a direction generally parallel to the path of movement of said linearly movable element, and means for selectively and individually moving said portions of said latching means laterally into engagement with at least one of said teeth portions.

References Cited in the file of this patent

UNITED STATES PATENTS

| | | |
|---|---|---|
| 651,502 | Fitzgerald | June 12, 1900 |
| 1,231,257 | Herr | June 26, 1917 |
| 1,671,106 | Fisher | May 29, 1928 |
| 1,965,751 | Rush | July 10, 1934 |
| 2,118,890 | Maes | May 31, 1938 |
| 2,155,529 | Clench | Apr. 25, 1939 |
| 2,626,669 | Moore | Jan. 27, 1953 |
| 2,789,712 | Christensen | Apr. 23, 1957 |
| 2,803,761 | Young | Aug. 20, 1957 |
| 2,845,902 | Anderson | Aug. 5, 1958 |
| 2,851,995 | Westcott | Sept. 16, 1958 |

FOREIGN PATENTS

| | | |
|---|---|---|
| 367,075 | Italy | June 14, 1936 |